United States Patent [19]

Martin et al.

[11] Patent Number: 4,861,458
[45] Date of Patent: Aug. 29, 1989

[54] PROCESS FOR CATALYTIC CRACKING OF A HYDROCARBON CHARGE SUBJECTED TO A PRETREATMENT WITH SOLID PARTICLES OF LOW ACTIVITY

[75] Inventors: Gérard Martin, Rueil-Malmaison; Alain Feugier, Orgeval, both of France

[73] Assignee: Institut Francais Du Petrole, Rueil-Malmaison, France

[21] Appl. No.: 239,006

[22] Filed: Aug. 29, 1988

Related U.S. Application Data

[63] Continuation of Ser. No. 929,450, Nov. 12, 1986, abandoned.

[30] Foreign Application Priority Data

Jun. 2, 1986 [FR] France .................................. 86 08008
Nov. 12, 1986 [FR] France .................................. 85 17817

[51] Int. Cl.⁴ .............................................. C10G 51/04
[52] U.S. Cl. ...................................... 208/73; 208/75; 208/127; 208/113
[58] Field of Search ............ 208/113, 153, 157, 73–78, 208/80, 143, 146, 127

[56] References Cited

U.S. PATENT DOCUMENTS

| | | |
|---|---|---|
| 3,459,655 | 8/1969 | Kimberlin, Jr. et al. ............ 208/127 |
| 3,758,403 | 9/1973 | Rosinski et al. .................. 208/75 X |
| 3,847,793 | 11/1974 | Schwartz et al. ...................... 208/74 |
| 4,116,814 | 9/1978 | Zahner .................................. 208/78 |
| 4,385,985 | 5/1983 | Gross et al. ......................... 208/113 |
| 4,405,444 | 9/1983 | Zandona ............................. 208/113 |
| 4,490,241 | 12/1984 | Chou .................................... 208/75 |
| 4,585,544 | 4/1986 | Gartside et al. ...................... 208/75 |
| 4,663,019 | 5/1987 | Gartside et al. ..................... 208/127 |

*Primary Examiner*—Glenn Caldarola
*Attorney, Agent, or Firm*—Millen, White & Zelano

[57] ABSTRACT

A process and an apparatus for catalytic cracking in a reaction zone operated with a fluid or a moving bed is disclosed, wherein the charge is subjected to at least one pretreatment.

According to the invention, at least a portion of said charge, as vapor 40, and at least a part of the catalyst particles 6, circulate at least in one enclosure 1, wherein at least said portion of charge, on the one hand, and said solid particles (of low catalytic activity), distinct from the catalyst particles, on the other hand, are contacted, said solid particles and said charge flowing, as a whole, in the same direction, either downwardly or upwardly in said enclosure 1, at a temperature substantially equal to the temperature prevailing at the inlet of the reaction zone. After stirring of the solid particles with the charge, the latter, free of the major part of the residual products, is separated at 27 from the solid particles and fed with the catalyst particles to the reaction zone 8.

The process and apparatus according to the invention can be used for refining heavy oil charges.

14 Claims, 2 Drawing Sheets

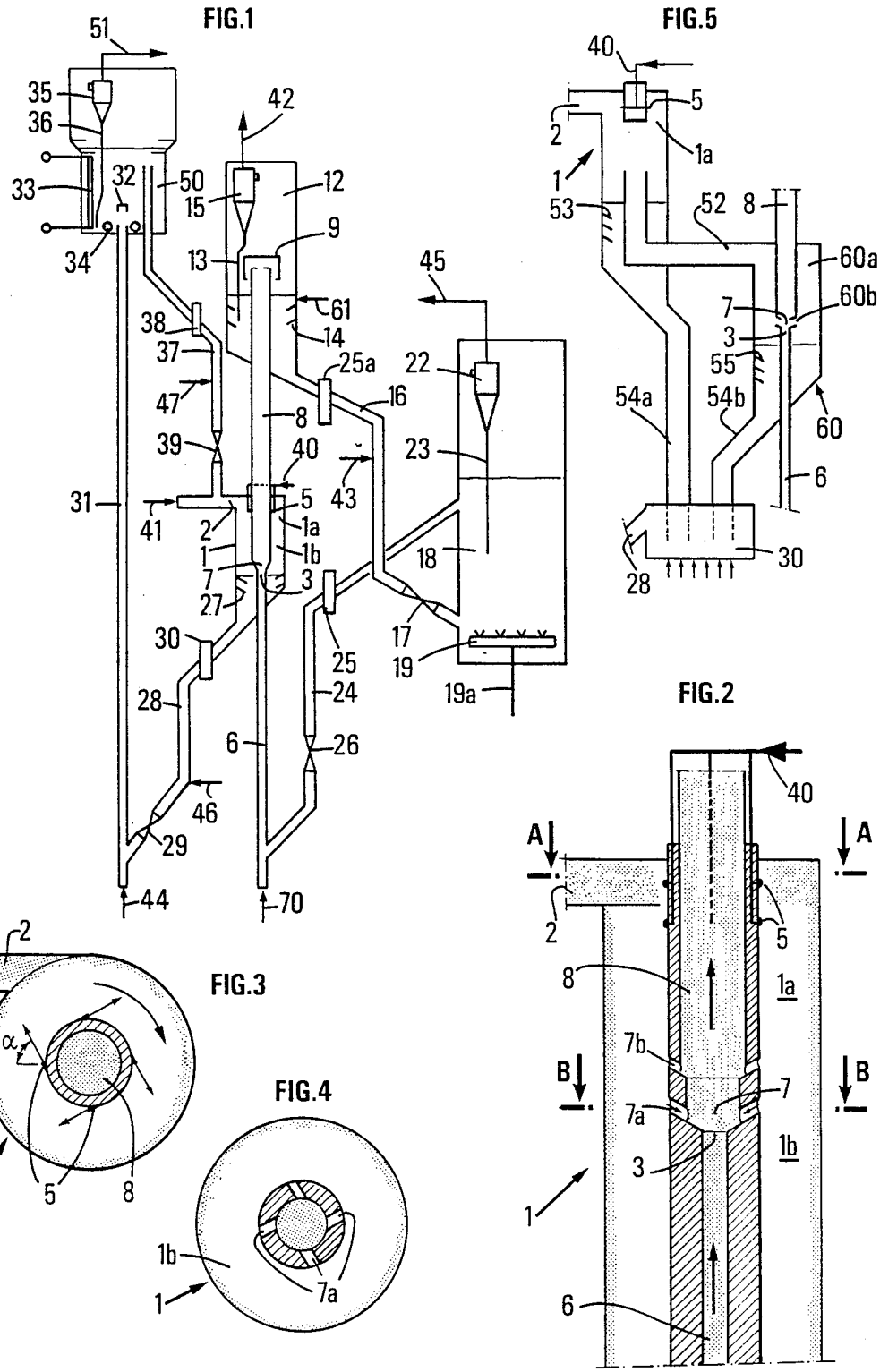

PROCESS FOR CATALYTIC CRACKING OF A HYDROCARBON CHARGE SUBJECTED TO A PRETREATMENT WITH SOLID PARTICLES OF LOW ACTIVITY

This application is a continuation, of application Ser. No. 06/929,450, filed Nov. 12, 1986 abandoned.

The present invention concerns a process for catalytic cracking of a hydrocarbon charge subjected to a pretreatment and a device for carrying out this process.

BACKGROUND OF THE INVENTION

The upgrading of heavy charges, commonly called residues, (straight-run residue, vacuum residue, deasphalted oils, etc.), by catalytic cracking requires modifications of the refining system in the oil industry.

For example, a pretreatment, in particular removing to a maximum extent coke and metals, which poison the catalyst, is considered hereinafter.

When the charge to be treated has maximum Conradson carbon (CCR) and metal contents of respectively 6–8% and 20–30 ppm (parts per million), the use of processes of the cracking type with fluid bed in an elongate tubular enclosure seems appropriate. On the contrary, when the charge is heavier (CCR>10) and mainly when its nickel and vanadium content reaches several hundred of ppm, the pretreatment is necessary, in view the performances of the catalysts presently available on the market. Several pretreatment techniques already exist, particularly delayed coking, fluid coking, hydrotreatment, deasphalting etc...

U.S. Pat. No. 4,243,514 discloses a pretreatment of the charge, in an enclosure provided therefor, by vaporizing the charge in admixture with previously heated inert solid particles. These particles have often sizes ranging from 20 to 150 μm and are directly generated in the regenerator by atomization of clay muds for example. The obtained microspheres are characterized by their low specific surface limiting the conversion rate to a low level. Nevertheless, they provide for the collection of 95% of the metals and of substantially the total amount of the asphaltenes initially contained in the charge. But the released effluents, forming a satisfactory charge for catalytic cracking in fluidized bed (F.C.C.), must be cooled before being conveyed to a catalytic cracking zone separate and distant from that where the pretreatment is performed, in order to reduce to a minimum the risk of thermal cracking, which would otherwise occur in view of the length of the passageway and in view of a substantial residence time at high temperature with, as a result, coke formation being favored in the conversion.

OBJECTS OF THE INVENTION

Hence, a first object of the invention is the pretreatment of a hydrocarbon charge by contact with solid particles of low catalytic activity, previously heated, which provide mainly for a thorough demetallation and a substantial removal of the potential coke contained in the charge during the residence time insufficient to produce a substantial thermal cracking.

By this technique, it is possible to build an integrated unit where the pretreatment and the catalytic cracking in fluidized bed are performed in two vicinal zones of the same enclosure, thus favoring a thermal flash of the charge, in view of the high transfer coefficients, and accordingly decreasing the coke formation and the parasitic cracking reactions in gas phase (formation of gaseous hydrocarbons and soots, etc...) inasmuch as the reactor provides for a quick mixing and a good homogeneity of the mixture, either with the pretreatment solid or with the catalyst.

Another object of the invention is to obtain a better and more selective conversion resulting in an increase of the charge fraction which can be upgraded since, in particular, proper catalytic cracking will be performed in atmosphere of hydrogen donor gaseous hydrocarbons.

By charge it is intended to mean the conventional charges, i.e. those having, for example, a final boiling point of about 400° C., such as vacuum gas oils, but also heavier hydrocarbon oils, such as crude and/or stripped oils, and straight-run or vacuum residues. These charges may have been subjected optionally to a previous treatment, such for example as a hydrotreatment, in the presence, for example, of cobalt-molybdenum or nickel-molybdenum type catalysts. The preferred charges according to the invention are those containing fractions normally boiling up to 700° C. and more, which may contain high percentages of asphaltene products and have a Conradson carbon content up to 10% or more. These charges may be diluted or not with lighter conventional cuts, which may include hydrocarbon cuts already subjected to cracking, which are recycled, as for example light cycle oils (L.C.O.) or heavy cycle oils (H.C.O.). According to a preferred embodiment of the invention, these charges are preheated within a temperature range from 300° to 450° C. before treatment.

SUMMARY OF THE INVENTION

The invention copes with the above-mentioned disadvantages and solves the problems arising by providing a process, performed in a reaction zone with fluid or moving bed, for cracking a hydrocarbon charge containing residual products, wherein the charge is subjected to at least one pretreatment, characterized in that a least a portion of the charge, as vapor, and at least a portion of the catalyst particles circulate in at least one enclosure wherein at least a portion of said charge, on the one hand, and solid particles distinct from the catalyst particles, on the other hand, are contacted, said solid particles and said charge circulating, as a whole, in the same direction, either downwardly or upwardly through said enclosure, at a temperature substantially equal to that prevailing at the inlet of the reaction zone, and in that, at the end of a stirring of the solid particles with said charge portion, said charge, free of the major part of the residual products, is separated from said solid particles and fed with said catalyst particles to the reaction zone.

The process according to the invention, inasmuch as the pretreatment of the charge is integrated with the proper catalytic treatment, has the advantage of producing a thermal flash of the charge, substantially reducing the thermal cracking and, accordingly, the preferential coke formation.

Besides, the high turbulence inherent to the hydrodynamic design of the enclosure (cyclone with helical flow, with or without reversal of the spiral or, for some embodiments of the process, two cyclones with helical flow without reversal of the spiral, or two cyclones with helical flow - FIG. 5 - one without reversal of the spiral and the other with reversal) provides for very high transfer coefficients which favor the thermal flash of the charge. This type of enclosure makes it possible to control and limit to very short times the residence of the vaporized products, thus reducing to a minimum the parasitic cracking reactions. By combination of the pretreatment loop with the catalytic cracking unit, the vaporized and pretreated charge is very quickly contacted with the catalyst before secondary parasitic reactions can develop, and this at the same thermal level, which saves power in the process.

The charge, so pretreated by a stream of solid particles to remove at least a portion of the residual products such as coke, metals and sulfur, becomes acceptable for the catalytic cracking catalysts. As a matter of fact, it is free of at least 90% of the initial residual products.

It may be advantageous to perform the pretreatment step by contact of the charge in a zone of the enclosure substantially upstream (with respect to the direction of the whole flow of solid particles) from the reaction zone inlet. Set inlet opens inside the reaction zone, preferably substantially in the middle part thereof. This pretreatment gives effluents free of the major part of the residual products, at a determined temperature, these effluents being then fed, at the same temperature, to the reaction zone.

It is still more advantageous to place the pretreatment zone in the part of the enclosure where the flow of solid particles is supplied, for example in the upper part when the flow of solid particles is supplied at that level.

The process according to the invention preferably comprises the following steps of:

- introducing the flow of solid particles having diameters ranging from 50 to 2000 $\mu$m, at a temperature ranging from 650° to 1000° C., in a stream of gas carrier adapted to impart to the particles a velocity from 10 to 80 m/s and in such a manner as to produce in the enclosure a helical flow of said particles,
- injecting in said enclosure at least a portion of the charge, by spraying or atomization means, so as to obtain an output velocity of said charge ranging from 10 to 150 m/s, in a direction such that the injection angle of the spraying means varies in the range from 0° to 80° with respect to the radius of the enclosure passing through the spraying means,
- also introducing, in said enclosure, at least a portion of the catalyst particles,
- maintaining the charge in contact with the solid particles, at a temperature from 450° to 650° C., for a residence time of the charge from 0.01 to 10 seconds,
- separating from the solid particles comprising residual products, a hydrocarbon fraction forming the pretreatment effluents, whose coke, metals and sulfur contents are lower than those of the charge, and
- feeding the pretreatment efluents with the cracking catalyst particles to the reaction zone.

According to a first embodiment of the process, the solid particles and the catalyst particles may flow cocurrently, either downwardly or upwardly. In a first case, the reaction zone is adapted to the downward direction of flow (see FIG. 6) of the catalyst, and in the second case, the reaction zone is adapted to an upward direction of flow, the reaction zone and the zone where the solid particles are contacted with the charge being generally at vertically opposite poles of the enclosure.

According to a second embodiment of the process, the solid particles and the catalyst particles may circulate countercurrently. For example (see FIG. 1) the solid particles and the charge first circulate downwardly and then the pretreatment effluents and the catalyst particles follow an upward path in the reaction zone; alternately, the solid particles and the charge may rise in the enclosure whereas the pretreatment effluents and the catalyst particles follow a downward path in the reaction zone. In these two embodiments, with counter-current flow, the reaction zone and the zone of contact of the charge with the solid particles are generally located substantially at the same end of the enclosure.

By using steam and light hydrocarbons of 1 to 3 carbon atoms as carrier gas for the pretreatment solids it is possible to dilute the vapors obtained, thereby reducing condensation reactions, and particularly to perform the vaporization in a hydrogenating atmosphere, giving an increased valorizable fraction of the charge and hence a better conversion, particularly as the presence of particular devices (fluid seals) as shown hereinafter, insulate the different atmospheres of the general apparatus.

The process comprises at least one step of regenerating solid particles in a fluid or moving bed, at a temperature preferably ranging from 500° to 1000° C., in the presence of oxygen or of a molecular oxygen-containing gas, in order to produce the combustion of at least 90% of the residual products present on the solid particles, then separating the major part of the combustion gases from the regenerated particles, at least partly recycling said regenerated particles to the enclosure, withdrawing at least periodically the metalcontaining solid particles originating from the regeneration step, without feeding them back to the pretreatment zone.

The regeneration of the solid particles may be conducted very advantageously in at least two steps, the first of which is performed in a substantially vertical and elongate tubular zone, whose L/D ratio (L being the length of the tube and D its diameter) ranges from 20 to 400, by means of a gas carrier essentially consisting of oxygen or of molecular oxygen-containing gas, at a temperature T1 ranging from 500° to 900° C., and is followed with a second regeneration step in a second zone of cylindrical shape, by means of a gas carrier mainly consisting of oxygen or of a molecular oxygen-containing gas, at a temperature T2 ranging from 650° to 1000° C., T2 being higher than T1.

In a preferred embodiment, the solid particles are in a finely divided state (diameter < 500 $\mu$m) and comprise for example calcite, dolomite or limestone. The particles are introduced at the bottom at the first regeneration zone, so that carbonate decomposes (releasing $CO_2$) in said zone before contacting the solid with the charge. In this way, it is possible to obtain a better desulfurization of the fumes generated by coke and charge oxidation.

According to another embodiment, at least a portion of the solid particles may be recycled, the finest particles being discharged in order to reduce the catalyst contamination. It may also be convenient to discharge a portion of the solid particles whose metal content, finally, would become too high and to replace it with fresh solid particles.

According to an advantageous embodiment, particularly when it is desired to enhance the separation of the two populations of solid particles and of catalyst particles, thereby limiting the contamination of the catalyst particles by dust of the solid particles, it is possible to conduct the pretreatment in two steps, the first step being performed in a first enclosure where at least a portion of the vaporized charge is contacted with a flow of solid particles, providing, after separation, a first pretreatment effluent comprising the major part of the solid particles charged with residues, and a second pretreatment effluent comprising solid particles charged with remaining residues and the major part of the charge free of at least one part of the residues. During a second step, the second effluent is fed to a second enclosure different from the first one, wherein is performed at least a second pretreatment, preferably identical to the first one, on at least a portion of said last charge and, after separation of said particles resulting from the second pretreatment, which are recovered with those of the first effluent, the pretreated charge resulting from said first and said second pretreatment is fed, with catalyst particles, to the reaction zone.

The solid particles are then regenerated and recycled according to the above described process.

The invention also concerns a catalytic cracking apparatus for carrying out the process (see FIG. 1) which comprises:

- at least one pretreatment enclosure 1 of the cyclone type,
- inlet means (40, 5) for a liquid or gas charge, comprising means for spraying said charge towards the inner periphery of the enclosure (the resultant charge flow being either downwardly or upwardly directed towards the inlet of the reactor defined below),
- inlet means (3, 7) (FIG. 2) for supplying catalyst particles to said enclosure 1,
- solid particles feeding means 2, imparting to said particles a helical motion on the walls of said enclosure in the direction of the charge resultant flow,
- means 27 for separating solid particles, on the one hand, from the pretreated charge, on the other hand (and from the catalyst particles driven along with the charge),
- means 28, connected to said enclosure 1, for solid particle conveyance toward a tank 50 for solid particles and at least one regeneration means 31 for said solid particles and means 37, 38, 39 for recycling regenerated solid particles toward the pretreatment enclosure 1,
- at least one inlet means 7a for feeding a mixture of pretreated charge with catalyst particles to one of the ends of a reactor (or reaction zone) 8 comprising a substantially vertical elongate tube, with co-current circulation of the pretreated charge (or pretreatment effluent) and of the catalyst particles, either downwardly (dropper) or upwardly (riser),
- stripping means 14, 9 for separating the reaction effluent from the catalyst particles at that end of the reactor opposite to the end of introduction of the pretreated charge and of catalyst particles,
- outlet means 15, 42, connected to said stripping means, for discharging the reaction effluent,
- means 16, connected to said stripping means 14, 9, for conveying catalyst particles toward at least one regenerator 18 for said particles, and
- means 24, 25, 26 for recycling catalyst particles at least partly toward said pretreatment enclosure 1.

The quick separation in the enclosure (cyclone with short contact time, for example shorter that one second), reduces the retromixing phenomena and also the over-cracking phenomena whose negative effects on the reaction selectivity are known.

BRIEF DESCRIPTION OF THE DRAWINGS

The invention will be better understood from the following description of non-limitative embodiments, diagrammatically illustrated by the accompanying drawings wherein:

FIG. 1 shows an embodiment of the catalytic cracking process according to the invention wherein the charge is subjected to a pretreatment and wherein the solid particles and the charge circulate, as a whole, in the same direction, countercurrently with the catalyst particles, FIG. 2 shows the enclosure where is performed the pretreatment and where the catalyst is introduced into the reaction zone, FIGS. 3 and 4 are cross-sectional views along planes AA' and BB', respectively at the level of charge and solid particles introduction and at the level of introduction of the pretreatment reaction effluents in the reactor, FIG. 5 shows an alternative embodiment of the process according to the invention.

FIG. 1 represents an embodiment of a pretreatment loop integrated with a catalytic cracking unit where the cracking reaction zone is adapted to an upward flow of the charge and of the catalyst particles, as in the example below, thus reducing the bulk in space. As shown, an enclosure 1 or cyclone, with direct passage and helical flow with reversal of the gas spiral, is vertically positioned and fed at its upper part 1a with a suspension, in a gas carrier, of previously heated solid particles originating from a downward line 37 extending from a regenerator 50, and with the charge to be vaporized, supplied through line 40. The gas phase forming the gas carrier which supports the solid particles may be steam when it is desired to decrease the partial pressure of the vaporization products, or light hydrocarbon (e.g. $C_{1-3}$-hydrocarbons) when it is desired to heat the charge in a hydrogenating atmosphere, or still any combination of these two categories of gas. This gas phase, supplied through line 41, is used to form a suspension of the solid particles in a device of the Venturi type or of any other type known in the art, said particles being supplied through an orifice 2 at the upper part 1 a of the cyclone so as to be introduced tangentially. The charge, which may be previously heated (from 100° to 350° C.), is introduced through line 40, ending with injectors 5, whose specific configuration will be described hereinafter, which open into the upper part 1a, it is then contacted, in a vaporized and atomized state, with the centrifuged solid particles of helical downward flow, at a temperature from 650° to 1000° C., which thus collect the major part of coke, metals and eventually sulfur. Ultra quick transfers are thus achieved between the solid particles and the charge. These charged particles are then stored in part 27 of the cyclone before being desorbed and subsequently regenerated.

Figure 6:
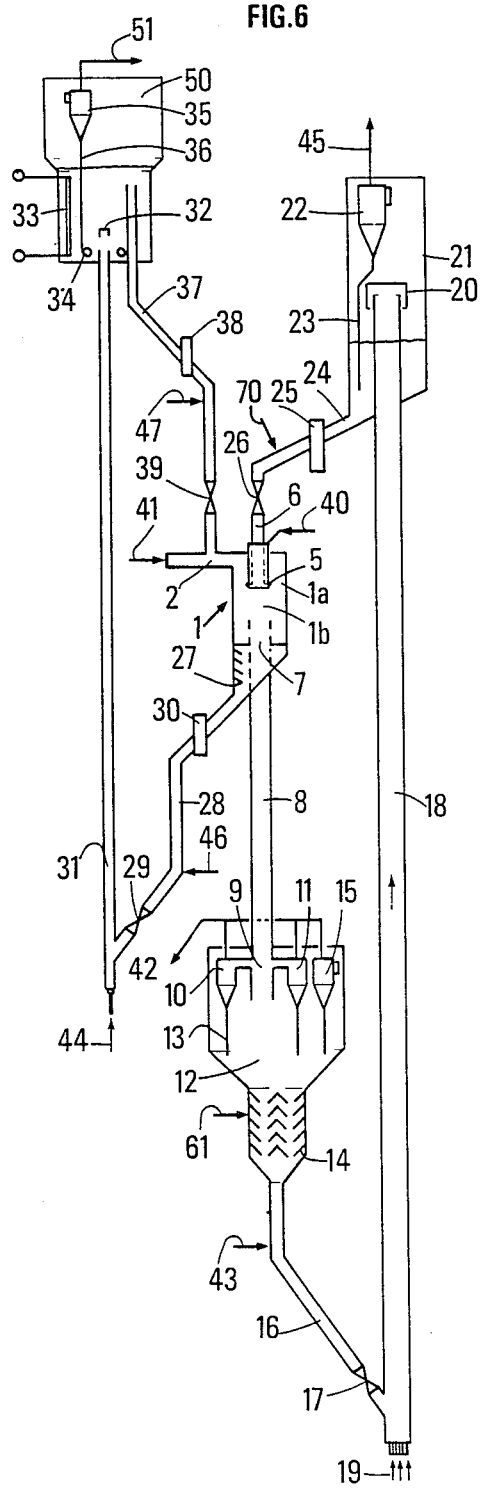
FIG. 6 illustrates another embodiment of the process where the solid particles and the charge circulate, as a whole, in the same direction, co-currently with the catalyst particles, and, FIG. 7 shows another embodiment of catalyst admission into the pretreatment enclosure.

The catalyst feed line 6, passing through the lower part of cyclone 1, substantially along its central axis, is arranged (FIG. 2) for conveying the catalyst originating from a regeneration zone towards middle zone 1b of the cyclone where it is contacted with the vaporized and pretreated charge. In addition, the conditions are so adjusted that the pressure in the enclosure is higher than the pressure in reaction zone 8, in order to limit the presence of catalyst particles in the enclosure. The pressure difference between enclosure 1 and reactor 8 is adjusted by pressure adjusting means known in the art and not shown on the figure, this means being for example located on the output lines of the regenerator and-/or the stripper.

According to FIG. 2, the catalyst originating from regenerator 18 is stripped with steam or light $C_{1-3}$-hydrocarbons introduced through a distributor 70. Then it enters through the output orifice of duct 6 towards the input orifice 7 of the reaction zone or reactor 8 whose lower end is contained in cyclone 1 substantially at the level of middle zone 1b. The input of pretreatment effluents may be provided at least at one level 7a and advantageously at two levels 7a and 7b of reactor 8, in order to better distribute these effluents on the catalyst particles. Duct 6 and reactor 8 are preferably built with substantially the same external diameter. According to a preferred but not limitative embodiment, and considering that the catalyst particles flow upwardly, the internal diameter of the duct, downstream level 7a, is higher than upstream that level 7a and lower than downstream level 7b. This arrangement makes easier the circulation at high velocity of the catalyst particles and limits their escape to the cyclone. It also provides for a better contact of hydrocarbons with the particles. According to an advantageous feature of the invention, the openings (7a, 7b) are beveled, so that the effluents keep, at the input, the circular motion and the high velocity they have acquired in the cyclone (FIG. 4), and they are advantageously directed downwardly to favor the mixing of the two phases.

The catalyst particles are then stripped with hydrocarbon vapors entering the reaction zone at high velocity, which favors the quick and homogeneous contact of the vapors with the catalyst.

In order to further increase the catalyst retention, and hence to decrease the total reaction volume, reactor 8 may be innerly provided with baffles or packing (not shown), such as Ras rings, Berl saddles, Intalox saddles, etc...

After mixing, the temperature reached by the hydrocarbon vapor/catalyst suspension may vary within a temperature range from about 450° C. to 650° C., depending on the desired conversion rate and on the charge composition. The hycrocarbon vapor/catalyst suspension then flows vertically in an upward direction through reactor 8.

The residence time of the hydrocarbon charge in enclosure 1 is from about 0.01 second to about 10 seconds, preferably from 0.2 second to 4 seconds.

The contact time of the pretreatment reaction effluent with the catalyst generally does not exceed 4 seconds and preferably remains lower than 2 seconds.

A ballistic separator 9 and at least one cyclone 15 provide for the separation of the most part of the cracking products from the catalyst.

A stripping enclosure 12 is used for storing the catalyst. The cyclone legs 13 dip into the catalyst bed in order to balance the pressures. The base 14 of said enclosure is equipped with means for separating the remaining products fixed on the catalyst, by means of steam fed through line 61. The resulting hydrocarbon vapors are discharged from the enclosure 12 through an output line 42 after passage through cyclone 15. The catalyst is then conveyed towards regenerator 18 by means of a line 16 wherein the fluidized state is continuously maintained by suitable injections of fluidization gas 43.

The following description of the catalyst regeneration is given by way of non limitative example and illustrates only one of the many possibilities for regenerating cracking catalysts.

The air required for oxidizing coke present on the catalyst is supplied by distributor 19, fed from line 19a.

At least one cyclone 22, for dust removal, provides in particular for the discharge of the combustion gas 45 resulting from the catalyst regeneration. As for other cyclones, the leg 23 of cyclone 22 dips into the bed of regenerated catalyst particles in order to balance the pressures. The regeneration enclosure 18 feeds a line 24, provided with a fluid seal 25, fluidized with steam, providing for a pneumatic insulation between enclosure 1 with reducing atmosphere and enclosure 18 with oxidizing atmosphere. This fluid seal is also adapted to stop the solid flow by stopping the fluidization during the non operating periods of the plant.

A valve 26 for adjusting the catalyst flow, placed at the lower part of line 24, may be controlled by a detector of catalyst particles level placed in enclosure 18, or may be controlled in response to any other variable of the process. It also regulates the input flow of catalyst particles in cyclone 1. The catalytic cracking and catalyst regeneration loop is thus achieved.

The pretreatment loop may be formed as follows (FIG. 1). After having contacted the solid particles with the charge, according to the process of the invention, these particles, charged in particular with residues (coke, metals, sulfur), may be subjected to a steam treatment (stripping) in a separation device 27 located at the lower part of cyclone 1 and destined to desorb also the hydrocarbons trapped on the solid particles. The lower part of cyclone 1 is connected to a line 28 equipped with a fluid seal 30 having as an object the insulation of the reducing atmosphere of cyclone 1 from the oxidizing atmosphere of column 31, and with a valve 29 for adjusting the flow of solid particles which may be controlled by the level of the solid particles in cyclone 1.

An upward column 31, fed with air 44 at its bottom part, provides for the combustion of a part of the coke deposited on the solids. These solids may be calcite, dolomite of limestone when the fumes generated by coke oxidation must be desulfurized. Limestone may be introduced preferentially at the bottom of the upward column 31 so that the major part of carbon dioxide generated by decomposition evolves during the first regeneration of the solid particles in column 31. For this purpose, it is used in a finely divided state (diameter lower than 500 μm). The decarbonatation is completed in enclosure 50, wherein column 31 opens, so as to achieve a substantially complete decarbonatation (carbonate removal) before contact with the charge in cyclone 1. This state of the desulfurizing agent also provides for an efficient collection of sulfur without requiring redhibitory Ca/S ratios. The top 32 of column 31 has a geometry adapted to provide for a good distribution of the solid particles in the fluidized bed.

Enclosure 50, wherein combustion of the coke in fluidized bed continues, is fed with fluidization air supplied by the annular device 34 in addition to that supplied at 44.

The distribution of the total air amount required for coke oxidation between the column and the fluidized dense bed is controlled by the temperature of the column which must be preferably maintained at about 800° C.

Enclosure 50 may be equipped with at least one exchanger tube 33 according to a technique disclosed in French patent No. 2 575 546 relating to exchangers with partitioned fluidized bed, so as to adjust the output temperature of the hot solid particles. It also has a storage function. The combustion fumes are discharged from regenerator 50 through line 51 after passage through cyclones 35 whose leg 36 dips into the fluidized bed.

The regenerated solids are collected through a line 37 provided, as the other lines, with a fluid seal 38 insulating the oxidizing atmosphere of regenerator 50 from the reducing atmosphere of cyclone 1 and with a valve 39 for solids, controlling the flow of solid particles supplied to cyclone 1.

In order to maintain the fluidization of the solid particles as well as of the catalyst, at least one fluidization steam input may be provided on various lines, for example, through line 43 on line 16, through line 46 on line 28 and through line 47 on line 37.

FIG. 2 shows a more detailed view of cyclone 1 at the level of the upper pretreatment zone 1a and of the median zone 1b of the catalyst tube.

The charge fed through line 40 is divided and injected by means of at least one array of spraying and atomization injectors 5, known in the art, arranged on the external wall of the reaction zone 8, for example of cylindrical shape. These injectors may be placed along a circle perpendicular to the duct axis, or helically. These injectors are so placed as to distribute the charge to be vaporized as uniformly as possible on the hot solids entering the cyclone, which circulate at high velocity along its periphery. The size of the droplets is generally from 10 to 300 μm. The input velocity in the cyclone and the ejection velocity of the charge are so adjusted that the droplets are substantially vaporized before striking the hot solids coating the wall. As shown in FIG. 3, the injectors may be arranged in the upper part 1a of cyclone 1, so as to drive the charge advantageously in the direction of flow of the spiral at an angle of about 0° to 80° with respect to the radius of the tube passing through the injector and preferably at an angle of about 30° to 60°, at a velocity varying generally from 10 to 150 m/s, preferably from 30 to 80 m/s, towards the solid particles supplied tangentially to cyclone 1, at a velocity generally from 10 to 80 m/s, preferentially from 20 to 40 m/s.

According to FIG. 5, illustrating another embodiment, the pretreatment process may be performed in two cyclones, one of which is cyclone 1 as above and the other cyclone 60.

Said solid particles are supplied through line 2 to the first cyclone which is fed, according to the process of the invention and as above-described, with charge through line 40 and injectors 5. A portion of the solids having adsorbed polluting residues (metals, coke) passes through steam separation means 53 to desorb the hydrocarbons. The latter are discharged through a line 52 with the other part of the solid particles and with the charge free of a part of its polluting residues. This line 52 opens substantially in the middle part of cyclone 1. The solids charged with polluting residues are discharged from cyclone 1, through the lower part, by means of a leg 54a joining a fluid seal 30. The effluents of the first cyclone are fed through line 52 to a second cyclone 60 with helical flow and spiral reversal, at a velocity of, for example, 20 to 100 m/s and the pretreatment according to the invention is continued in the upper part 60a of said cyclone 60. The charge, free of the major part of metals, coke and sulfur, to which are added the hydrocarbons trapped in the solid particles and which have been desorbed by the second steam separation means 55, is contacted with the catalyst which is upwardly fed through line 6 to the middle part 60b, at a velocity substantially similar to that indicated for the first embodiment. The cracking reactor or reaction zone 8, which is upwardly directed according to this embodiment illustrated in FIG. 5, opens substantially at this same level. The solid particles charged with polluting residues are discharged from the second cyclone through a leg 54b, extending to the fluid seal 30 wherein leg 54a also opens, and are then conveyed through line 28 to the solid particle regeneration zones 31 and 50.

According to another embodiment, not shown on FIG. 5, the reactor 8 may be oriented downwardly, the cyclone 60 being then with helical flow but without spiral reversal and the catalyst supply through line 6 also downwardly directed.

This cascade arrangement of two cyclones improves the separation between the two particle populations, i.e. the pretreatment solids, on the one hand, and the cracking catalyst, on the other hand. It also limits the contamination of the catalyst by dust of the pretreating agent.

According to another embodiment, the finest particles are not recycled in order to further limit the catalyst contamination. In these conditions the cyclones of the solid particles regenerator may be placed outside of the regeneration enclosure for said particles in order to remove a part of the latter which have been collected. This solution is the more advantageous as the demetallation, decoking and/or desulfurization agent is inexpensive.

FIG. 6 shows, by way of illustration, another embodiment of pretreatment loop identical to that of FIG. 1, integrated with a catalytic cracking unit with downward cracking reaction zone 8. The solid particles and the charge circulate through the enclosure, as a whole, in the same downward direction, cocurrently with the catalyst.

Cyclone 1 is here of the Uniflow type with direct passage, helical flow and without reversal of the gas spiral. On FIG. 6 the same parts as in FIG. 5 are indicated with the same reference numbers. In addition, the stripping enclosure 14, into which reactor 8, opens is shown diagrammatically, by way of illustration, as comprising two cyclones 10 and 11, associated with the ballistic separator 9 for separating the catalyst, which is discharged through line 42.

The regeneration of the catalyst particles is illustrated, by way of example, in the flow-sheet of FIG. 6, as follows:

An upward column 18 provides for a first regeneration of the catalyst and its lift, up to the storage and regeneration enclosure 21. This enclosure surrounds a ballistic separator 20 at the output of column 18 and at least one cyclone 22 for dust removal provides, in particular, for the discharge of the combustion gases 45 resulting from the catalyst regeneration. The leg 23 of cyclone 22 dips into the bed of regenerated catalyst particles in order to balance the pressure. The enclosure 21 feeds a line 24, which is provided with a fluid seal 25, fluidized with steam, for pneumatically insulating the enclosure 1 with reducing atmosphere from the enclosure 21 with oxidizing atmosphere. This fluid seal is also used to stop the flow of solid particles by stopping the fluidization during the non operating periods of the plant.

A valve 26, for adjusting the catalyst flow rate, placed at the lower part of line 24 may be controlled from a detector of the catalyst particles level placed in enclosure 21 or may be controlled by any other variable of the process. It also regulates the input flow rate of particles to the Uniflow cyclone 1.

Figure 7:
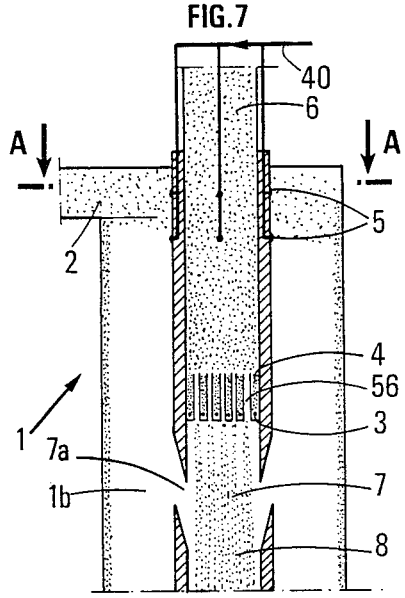

FIG. 7 shows another type of catalyst admission to the pretreatment enclosure 1, which may be applied, as well as for the system shown in FIG. 2, equally on pretreatment and cracking loops illustrated in FIGS. 1 and 6, i.e. in cyclones with or without spiral reversal, with an upward or downward reactor 8.

On FIG. 7, the catalyst feeding duct 6 passes through the upper part of cyclone 1 substantially along its central axis. Its inner part is adapted to convey the regenerated catalyst to the middle zone 1b of the cyclone where it is contacted with the vaporized and pretreated charge. As a matter of fact, the catalyst originating from the regenerator falls in a bed 4, fluidized with steam or light hydrocarbons ($C_{1-3}$) introduced through sparged-tubes 3. Then it enters, by overflow, in gutters 56, uniformly distributed over the cross-sectional area of the fluidized bed, which direct the catalyst particles and the hydrocarbon vapors to the input orifice 7 of the reaction zone 8, whose upper end is contained in cyclone 1, substantially at the level of zone 1b.

The input orifice 7a of reactor 8 and the output orifice of catalyst duct 6 have preferably a beveled shape providing for an inflow at high velocity of the hydrocarbon vapors, substantially tangentially to the catalyst flow. This arrangement avoids to a major extent the dispersion of the catalyst outside of the reaction zone. Moreover the catalyst particles flowing by gravity from the gutters are accelerated by the hydrocarbon vapors entering the reaction zone at high velocity, thus favoring a quick and homogeneous contact of the vapors with the catalyst.

The liquid hydrocarbon charge, a gas oil or hydrocarbons of higher boiling point, preheated upstream (by a system not shown) may be introduced with a certain amount of dispersing steam to reduce the partial pressure of the volatile components of the charge.

The pretreatment solid particles may generally have a specific surface lower than 100 m$^2$/g (determined by the so-called BET method, using nitrogen absorption) preferentially loewr than 50 m$^2$/g and more preferably lower than 30 m$^2$/g. They have a size preferably ranging from 50 to 2000 μm and, more particularly, from 100 to 300 μm. These microspheres have a low catalytic activity (for example lower than about 10% as compared to a 100% value corresponding arbitrarily to the average usual activity of a cracking catalyst) and are inexpensive. It is hence recommended to reject from time to time a part thereof and to replace it with the same amount of fresh material, so as to maintain an acceptable metal content. As a matter of fact, their analysis shows that they contain, in addition to minerals, silica, alumina and small amounts of impurities as titanium, iron and alkaline-earth metals. The solid particles are for example those described in U.S. Pat. No. 4,243,514, such for example as calcite, dolomite, limestone, bauxite, barium hydroxide, chromite, zirconia, magnesia, perlite, alumina and silica of low specific surface, etc.

The catalysts are those generally used in cracking reactions. Preferred catalysts contain as main constituents zeolites of specific surface generally higher than 100 m$^2$/g (BET method) and, among them, those having a good thermal stability in the presence of steam.

What is claimed as the invention is:

1. A process for the fluid bed catalytic cracking of a hydrocarbon charge containing residual products in a reaction zone wherein catalyst particles circulate under cracking conditions, wherein the charge is subjected to at least one pretreatment comprising:
   providing solid particles in at least one enclosure comprising a central axis and an internal periphery and circulating said solid particles in a pretreatment zone of said enclosure at the internal periphery of the enclosure, said solid particles having low catalyst activity being distinct from said catalyst particles:
   contacting at least a portion of said charge with said solid particles;
   circulating in said enclosure in vortex flow, said charge and said solid particles cocurrently so that a pretreatment effluent, free of the major part of said residual products is obtained;
   separating said effluent from said solid particles in said enclosure,
   feeding said pretreatment effluent substantially free of solid particles directly into the reaction zone, said effluent being at a temperature substantially equal to the temperature prevailing in said enclosure, said reaction zone being telescoped at least in part on said enclosure substantially along the central axis.

2. A process according to claim 1, wherein the reaction zone has an input opening inside said enclosure and wherein said pretreatment zone in said enclosure is substantially upstream from said reaction zone input.

3. A process according to claim 1, wherein said pretreatment comprises the steps of:
   introducing the flow of solid particles of a diameter varying from 50 μm to 2000 μm, at a temperature ranging from 650° to 1000° C., in a stream of gas carrier adapted to impart to the particles a velocity of 10 to 80 m/s, and providing a helical flow to the solid particles,
   injecting in said enclosure at least a portion of the charge by spraying or atomization means, so that the charge output velocity is from 10 to 150 m/s, in such a direction that the injection angle of the spraying means varies from 0° to 80° with respect to the radius of the enclosure passing through said spraying means,
   contacting the charge with the solid particles, at a temperature from 450° C. to 650° C., for a residence time of the charge in the pretreatment zone of the enclosure of 0.01 to 10 seconds,
   stripping from the solid particles containing the residual products, a hydrocarbon fraction forming a pretreatment effluent of lower coke, metals and sulfur content than the charge, and
   feeding said pretreatment effluent into said reaction zone.

4. A process according to claim 1,
   wherein after separation of the pretreatment effluent from the solid particles, said solid particles are regenerated in fluidized bed, at a temperature from 500° to 1000° C., in the presence of oxygen or of a molecular oxygen-containing gas in order to produce the combustion of at least 90% of the residual products present on the solid particles, separating the major part of the combustion gas from the regenerated particles, recycling at least a portion of said regenerated particles to the enclosure and, at least periodically, withdrawing the metals-containing solid particles originating from the regeneration step, without feeding them back to the enclosure.

5. A process according to claim 4, characterized in that said regeneration is conducted in at least two steps, the first step in a substantially vertical and elongate tubular zone whose ratio L/D (L being the tube length and D its diameter) ranges from 20 to 400, by means of a gas carried essentially consisting of oxygen or of a molecular oxygen-containing gas, at a temperature T1 ranging from 500° to 900° C., followed with a second regeneration step in a second zone by means of a gas carrier essentially consisting of oxygen or molecular oxygen-containing gas, at a temperature T2 ranging from 650° C. to 1000° C., T2 being higher than T1.

6. A process according to claim 1, wherein the solid particles are selected from the group consisting of calcite, dolomite, limestone, bauxite, barium hydroxide, chromite, magnesia, perlite, alumina and silica of low specific surface.

7. A process according to claim 3, wherein the gas carrier is steam or hydrocarbons having 1 to 3 carbon atoms.

8. A process according to of claim 1, wherein the pretreatment is performed in two steps, the first step being conducted in a first enclosure where at least a portion of the vaporized charge is contacted with a stream of fluidized solid particles, giving, after separation, a first pretreatment effluent comprising the major part of the solid particles charged with residues and a second pretreatment effluent comprising solid particles charged with remaining residues and the major part of the charge free of at least a part of the residues, the second step comprising feeding said second effluent to a second enclosure different from the first one, wherein at least one second pretreatment is performed on at least one part of said charge and, after separation of said particles resulting from the second pretreatment, which are recovered with those of the first effluent, the pretreated charge from these first and second pretreatments is fed to the reaction zone.

9. A process according to claim 1, wherein said solid particles and said charge circulate, as a whole, cocurrently with the catalyst particles.

10. A process according to claim 1, wherein said solid particles and said charge circulate, as a whole, countercurrently with the catalyst particles.

11. A process according to claim 1, wherein the pressure difference between said reaction zone and the the pretreatment zone is adjusted in order to substantially restrict the presence of catalyst particles from said pretreatment zone in the enclosure.

12. A process according to claim 1, wherein the residual products in the charge comprise asphaltenes, coke, sulfur or metals.

13. A process according to claim 1, wherein the catalytic activity of the solid particles is lower than about 10% of the average activity of the catalyst.

14. A process according to claim 4, wherein the catalytic activity of the solid particles is lower than about 10% of the average activity of the catalyst.

* * * * *